Patented Jan. 25, 1927.

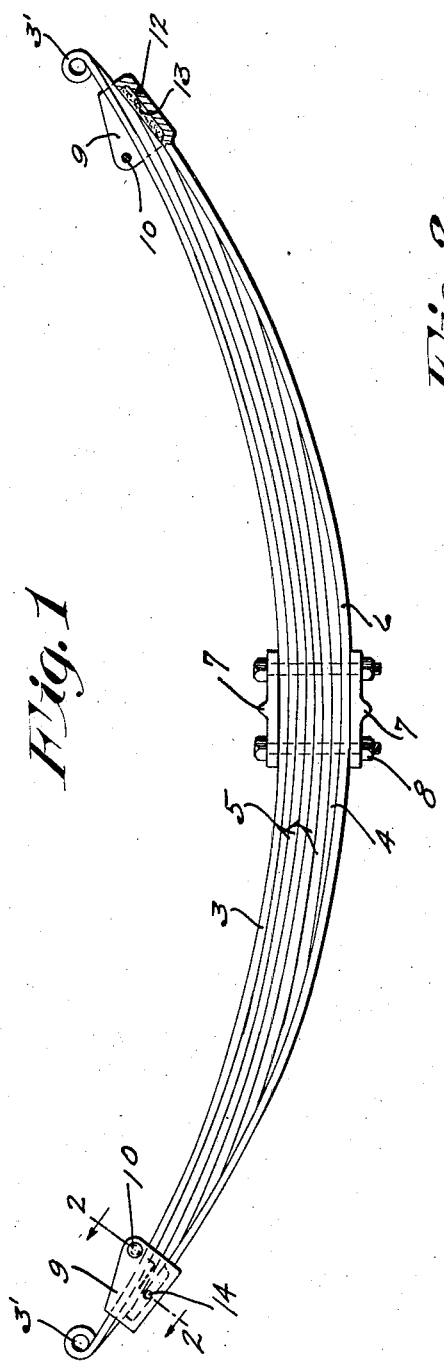
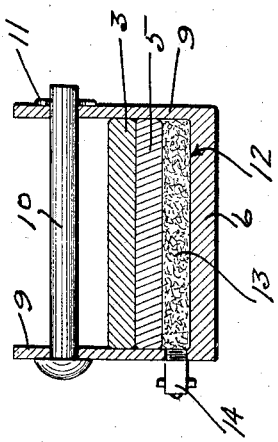

UNITED STATES PATENT OFFICE.

THOMAS KERNAN, OF ST. CLOUD, MINNESOTA.

SNUBBER-ACTING AUXILIARY LEAF FOR LEAF SPRINGS.

Application filed June 25, 1925. Serial No. 39,493.

My present invention has for its object to provide a snubber-acting auxiliary leaf for leaf springs, and to this end it consists of the novel devices and combinations of devices hereinafter described and defined in the claim.

In the accompanying drawings, which illustrate the invention, like characters indicate like parts throughout the several views.

Referring to the drawings:

Fig. 1 is a side elevation of the invention applied to a leaf spring, some parts broken away and sectioned; and Fig. 2 is a transverse section, taken on the irregular line 2—2 of Fig. 1, on an enlarged scale.

The invention, as illustrated, is applied to a half elliptical leaf spring for vehicles, and which spring comprises a major leaf 3, a minor leaf 4 and a plurality of intermediate leaves 5. Said major leaf 3 has at its ends eyes 3' adapted to receive spring bolts, not shown, for securing the spring to a vehicle.

The snubber-acting auxiliary leaf 6 is applied to the under side of the minor leaf 4 and is of a length to extend nearly to the ends of the major leaf 3. The leaves 3, 4 and 5 and auxiliary leaf 6 are clamped together at their longitudinal centers by upper and lower plates 7 and nut-equipped bolts 8 passed through aligned bores in said plates outward of the edges of said leaves. It may be here stated that the auxiliary leaf 6 is under spring strain to bow toward the major leaf 3 and frictionally engage the ends of all of the leaves 4 and 5.

On the edges of the auxiliary spring 6, at the ends thereof, are upstanding side clips or flanges 9 which project above the major leaf 3 and hold the leaves which project therebetween against edgewise movement in respect to each other. Headed side clip bolts 10 are extended through aligned bores in the side flanges 9, transversely over and slightly out of engagement with the major leaf 3. These side clip bolts 10 are held against endwise removal from the side clips 9 by cotter pins 11.

The auxiliary leaf 6 between each pair of side flanges 9 is depressed to form an oil or grease pan or pocket 12 in which is placed waste or other absorbent material 13 for retaining oil or grease. Oil or grease is supplied to the pans or pockets 12 through check valve-equipped nipples 14 to which may be detachably applied a grease gun. If desired, ordinary grease cups may be substituted for the nipples 14. Obviously, the oil or grease in the pockets 12 will work down between the leaves 4 and 5 and the auxiliary leaf 6.

Under the straightening action of the leaves 4 and 5, due to a load carried thereby, the ends of the leaves 4 and 5 will frictionally move longitudinally on the auxiliary leaf 6 and thereby create a snubbing action to retard the straightening movement of said leaves 4 and 5. Furthermore, the auxiliary leaf 6 greatly reinforces the leaves 3, 4 and 5 and materially assists in carrying the load and also increases the efficiency of the spring. The spacing of the side clip bolts 10 from the major leaf 3 permits free endwise movements of the leaves, the one upon the other.

During a rebound of the spring, the major leaf 3 will engage the side clip bolts 10 as yielding stops to prevent breaking of said leaf, and at the same time the end of the leaves 4 and 5 frictionally move on the auxiliary leaf 6 and thereby produce a dampening action to assist in retarding the rebound of the spring.

The snubber-acting auxiliary leaf 6 binds all of the leaves of the spring together so that instead of the major leaf and possibly one of the intermediate leaves taking the rebound as in ordinary springs, the strain is taken by all of the leaves of the spring.

While the auxiliary leaf 6 has been illustrated as a part of the spring, it is of course evident that the same may be sold to the trade as an accessory and applied to standard springs.

What I claim is:

A snubber-acting auxiliary leaf applicable to the minor leaf of a spring and being of such length as to overlap the ends of certain of the intermediate leaves of the spring, said auxiliary spring having at its ends open grease pans and being of a bow greater than that of the spring, whereby it frictionally engages the ends of said intermediate leaves and exposes the same to the grease in said pans, the sides of the pan being extended to form pairs of flanges between which the major leaf extends, and bolts inserted through holes in said pairs of flanges and transversely over said major leaf.

In testimony whereof I affix my signature.

THOMAS KERNAN.